United States Patent [19]

Ishikawa

[11] Patent Number: 5,596,445
[45] Date of Patent: Jan. 21, 1997

[54] LIGHT SCANNING SYSTEM

[75] Inventor: Hiromi Ishikawa, Kanagawa, Japan

[73] Assignee: Fuji Photo Film Co., Ltd., Kanagawa, Japan

[21] Appl. No.: 624,931

[22] Filed: Mar. 29, 1996

[30] Foreign Application Priority Data

Mar. 30, 1995 [JP] Japan ................................. 7-073431

[51] Int. Cl.$^6$ .................................................. G02B 26/08
[52] U.S. Cl. ..................... 359/210; 359/216; 250/201.4; 250/236
[58] Field of Search .................................. 359/205–210, 359/216–219, 196–197; 347/258–261; 250/234–236, 201.2, 201.4; 348/202–203; 358/296, 302

[56] References Cited

U.S. PATENT DOCUMENTS

| | | | |
|---|---|---|---|
| 5,054,866 | 10/1991 | Tomita et al. | 359/210 |
| 5,276,544 | 1/1994 | Maeda | 359/210 |

FOREIGN PATENT DOCUMENTS

| | | |
|---|---|---|
| 3-65918 | 3/1991 | Japan. |
| 3-73911 | 3/1991 | Japan. |

*Primary Examiner*—James Phan
*Attorney, Agent, or Firm*—Sughrue, Mion, Zinn, Macpeak & Seas

[57] ABSTRACT

In a light scanning system, a semiconductor laser outputs a laser beam which diverges with a beam divergence angle. A condensing/scanning optical system condenses the laser beam and causes the laser beam to scan a predetermined surface-to-be-scanned. The distance between the beam waist of the laser beam and the surface-to-be-scanned as measured in the direction of the optical axis of the condensing/scanning optical system is set larger as the beam divergence angle of the laser beam as emitted from the semiconductor laser increases so that the beam diameter of the laser beam on the surface-to-be-scanned is constant irrespective of the beam divergence angle of the laser beam as emitted from the semiconductor laser.

3 Claims, 2 Drawing Sheets

LIGHT SCANNING SYSTEM

BACKGROUND OF THE INVENTION

1. Field of the Invention

This invention relates to a light scanning system, and more particularly to a light scanning system in which a semiconductor laser is employed as a light source.

2. Description of the Related Art

A semiconductor laser has been in wide use as a light source in various light scanning systems such as a recording system, a reading system and the like because of its various advantages. For example, the semiconductor laser is small in size, low in cost and small in power consumption as compared with a gas laser and permits direct analog modulation, that is, the output of the semiconductor laser can be changed by controlling the drive current.

Such a light scanning system generally comprises a semiconductor laser, a scanning optical system including a polygonal mirror, an fθ lens and the like which condenses a laser beam emitted from the semiconductor laser and causes the laser beam to scan a predetermined surface, and a surface tilt compensating optical system such as a cylindrical mirror or a cylindrical lens which is disposed between the semiconductor laser and the scanning optical system and corrects fluctuation in position of scanning spots due to a surface tilt in a deflector such as the polygonal mirror.

The semiconductor laser is very small (in the order of 1 µm) in width of an active layer (core) which emits a laser beam and is in the order of the oscillating wavelength in size of the opening in the output window. Accordingly the divergence angle of the laser beam emitted through the opening is extremely larger than that in the gas laser and the beam divergence angle itself fluctuates by about ±10% from laser to laser.

For example, in a GaAlAs laser diode, though the standard value of the beam divergence angle (at the full width at half maximum) in a direction perpendicular to the direction of junction is 38° under a predetermined condition, the beam divergence angle can fluctuate from 20° (smaller than the standard value by 18°) to 45° (larger than the standard value by 7°).

The laser beam output with such a beam divergence angle is generally collimated into parallel rays by a collimator lens or the like and the collimated laser beam is converged to a desired beam diameter and caused to scan a predetermined surface at the beam waist thereof by a condensing/scanning optical system, whereby reading or recording of information is effected.

Since the intensity of the scanning laser beam exhibits Gaussian distribution, the beam divergence angle 2θ of the laser beam, the wavelength λ of the laser beam and the beam diameter r0 at the beam waist satisfy the following formula (1).

$$r0 = \lambda / \Pi \theta \quad (1)$$

As can be understood from the formula (1), the beam diameter r0 at the beam waist becomes smaller as the beam divergence angle θ increases.

Since the beam divergence angle of a laser beam as emitted from a semiconductor laser fluctuates from laser to laser as described above, the spot size of the laser beam scanning the surface differs by the semiconductor laser used, which results in fluctuation, for instance, in image quality of the recorded image such as resolution from system to system.

It is preferred that the spot size be constant irrespective of the semiconductor laser used.

There has been proposed, as disclosed for instance in Japanese Unexamined Patent Publication No. 63(1988)-51687, a technique for condensing spontaneous emission which is emitted from a semiconductor laser together with a laser beam into a spot as small as that of the laser beam. When a mask plate having an opening which permits only light in the central portion of the laser beam to pass therethrough is disposed in the path of the laser beam emitted from the semiconductor laser in accordance with the technique, light in the periphery of the laser beam is cut and the spot size on the surface to be scanned can be constant irrespective of the beam divergence angle of the laser beam as emitted from the semiconductor laser, whereby fluctuation in image quality can be prevented.

However this approach is disadvantageous in that a part of the laser beam is cut and lost by the mask plate and accordingly efficiency of utilization of the laser beam is deteriorated.

SUMMARY OF THE INVENTION

In view of the foregoing observations and description, the primary object of the present invention is to provide a light scanning system in which the spot size on the surface to be scanned can be constant irrespective of the beam divergence angle of the laser beam as emitted from the semiconductor laser and at the same time the laser beam emitted from the semiconductor laser can be efficiently used without loss.

In accordance with the present invention, there is provided a light scanning system comprising a semiconductor laser which outputs a laser beam which diverges with a beam divergence angle, a condensing/scanning optical system which condenses the laser beam and causes the laser beam to scan a predetermined surface-to-be-scanned and a surface tilt compensating optical system which compensates for fluctuation in the scanning position of the laser beam due to a surface tilt in the condensing/scanning optical system, wherein the improvement comprises that the distance between the beam waist of the laser beam and the surface-to-be-scanned as measured in the direction of the optical axis is set larger as the beam divergence angle of the laser beam as emitted from the semiconductor laser increases so that the beam diameter of the laser beam on the surface-to-be-scanned is constant irrespective of the beam divergence angle of the laser beam as emitted from the semiconductor laser.

The present invention may be applied to any light scanning system so long as it condenses a laser beam which diverges with a beam divergence angle and causes it to scan a predetermined surface-to-be-scanned, and, for example, need not have a surface tilt compensating optical system. For example, a simple relay lens may be used instead of the surface tilt compensating optical system so long as the distance between the beam waist of the laser beam and the surface-to-be-scanned as measured in the direction of the optical axis is set according to the beam divergence angle of the laser beam as emitted from the semiconductor laser, e.g., larger as the beam divergence angle increases, so that the beam diameter of the laser beam on the surface-to-be-scanned is constant irrespective of the beam divergence angle of the laser beam.

In the light scanning system in accordance with the present invention, the optical system is set so that the laser beam impinges upon the surface-to-be-scanned at its beam waist when the beam divergence angle of the semiconductor laser used is minimum and set so that the beam waist of the laser beam is positioned away from the surface-to-be-scanned as the beam divergence angle of the semiconductor laser used increases. Since the beam diameter of the laser beam is minimum at its beam waist and the beam diameter at its beam waist decreases as the beam divergence angle increases as described above, the beam diameter of the laser beam on the surface-to-be-scanned or the spot size can be made constant by changing the position of the beam waist relative to the surface-to-be-scanned according to the beam divergence angle of the semiconductor laser used, whereby the performance of the light scanning system can be stabled without affected by difference in the beam divergence angle which fluctuates from laser to laser.

DESCRIPTION OF THE PREFERRED EMBODIMENT

Figure 1A:
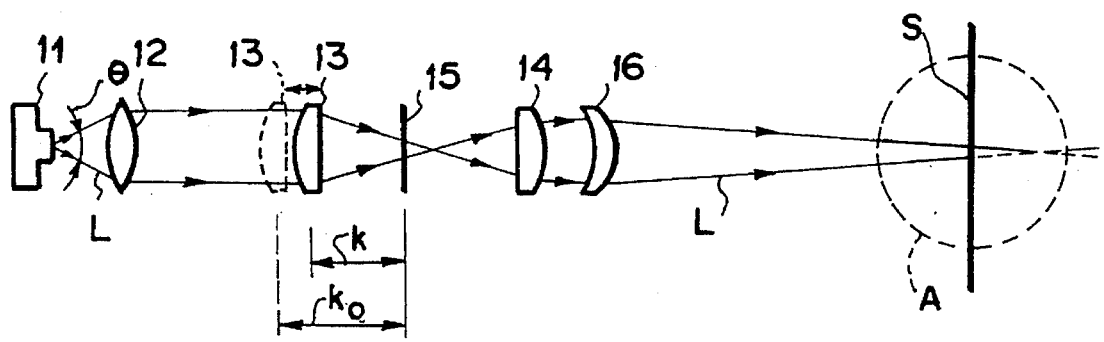
FIG. 1A is a side view of a light scanning system in accordance with an embodiment of the present invention.
Figure 1B:
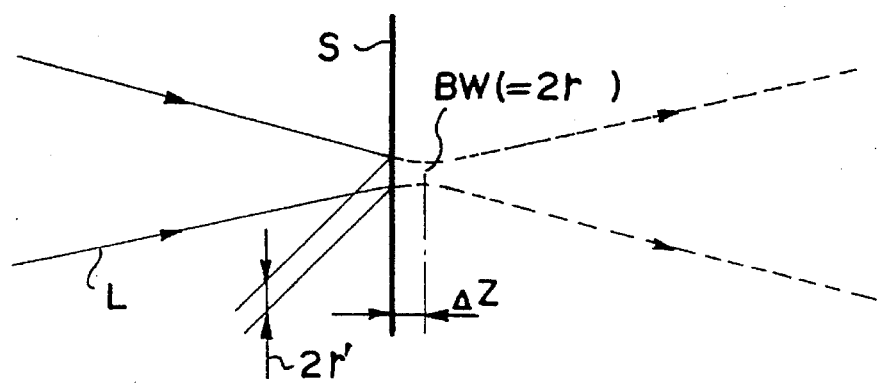
FIG. 1B is an enlarged view of the part surrounded by circle A in FIG. 1A.
Figure 2:
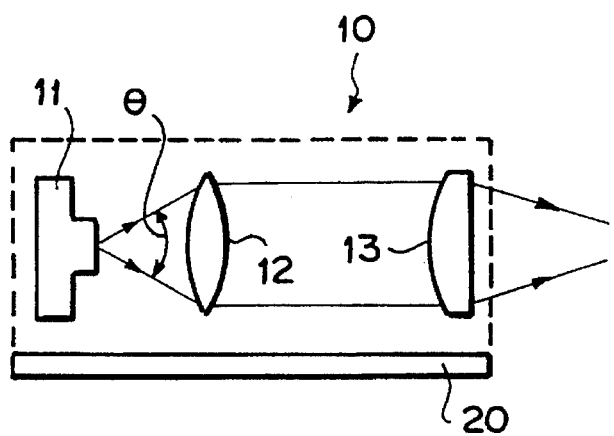
FIG. 2 shows a unit including the semiconductor laser and the surface tilt compensating optical system of the light scanning system.

In FIGS. 1A, 1B and 2, a light scanning system in accordance with an embodiment of the present invention comprises a semiconductor laser 11 which emits a laser beam L with a beam divergence angle θ (in a direction perpendicular to the direction of junction) within the range of, for instance, 5° to 20°, a collimator optical system 12 which collimates the laser beam L of the beam divergence angle θ into substantially parallel rays, a first cylindrical lens 13, a rotary polygonal mirror 15 which is rotated at a high speed to deflect the laser beam L to scan a surface-to-be-scanned S (main scanning), a second cylindrical lens 14 and an fθ lens 16 which focuses the substantially parallel laser beam L. The polygonal mirror 15 and the fθ lens 16 form a condensing/scanning optical system and the first second cylindrical lenses 13 and 14 form a surface tilt compensating optical system which compensates for tilt in a deflecting surface of the polygonal mirror 15.

Figure 3A:
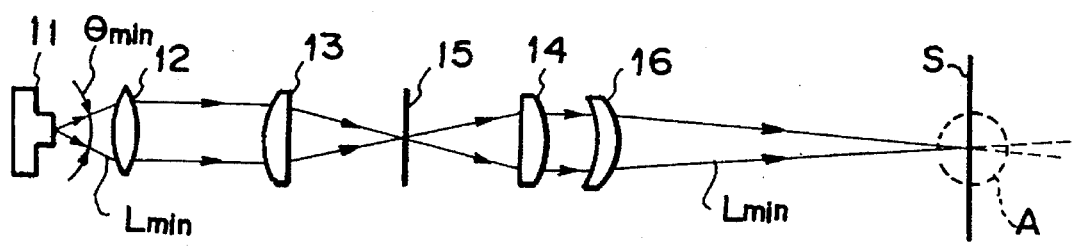
FIG. 3A is a side view of the light scanning system as provided with a semiconductor laser whose beam divergence angle is minimum.
Figure 3B:
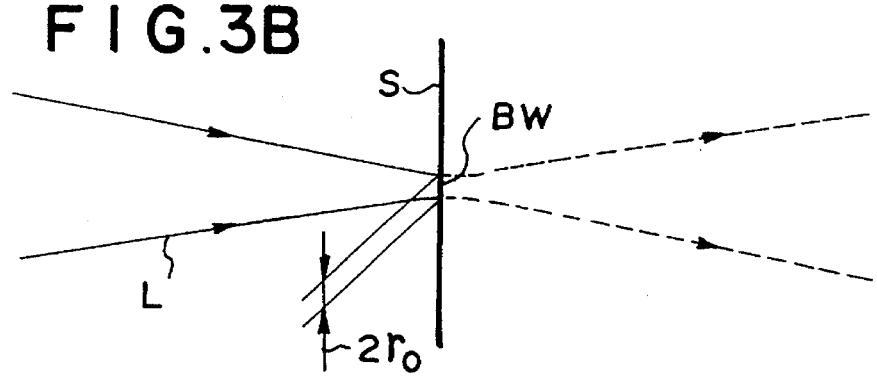
FIG. 3B is an enlarged view of the part surrounded by circle A in FIG. 3A.
Figure 3C:
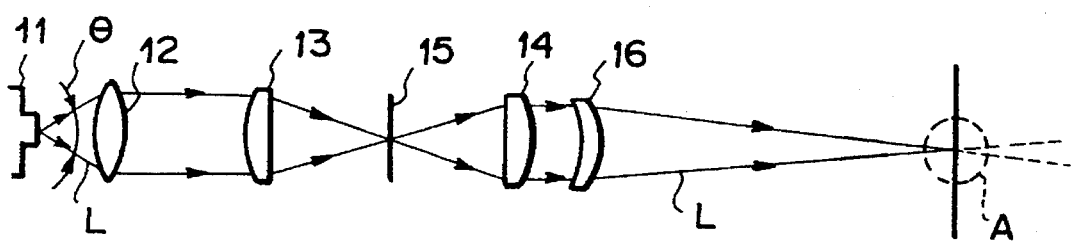
FIG. 3C is a side view of the light scanning system as provided with a semiconductor laser whose beam divergence angle is larger than the minimum beam divergence angle.
Figure 3D:
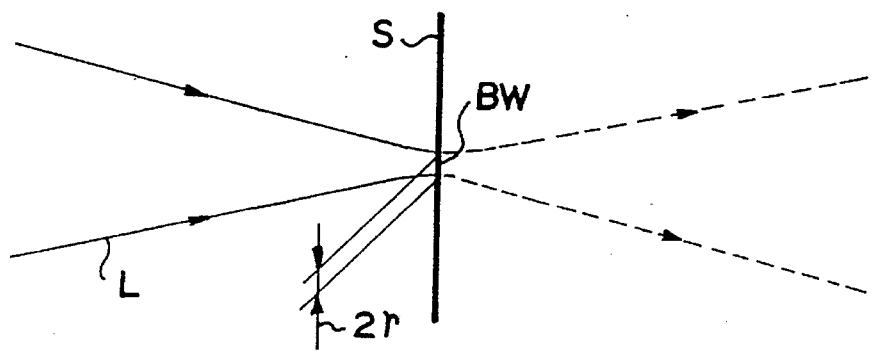
FIG. 3D is an enlarged view of the part surrounded by circle A in FIG. 3C.

The polygonal mirror 15, the second cylindrical mirror 14 and the fθ lens 16 are arranged so that a beam waist BW of the laser beam is positioned on the surface-to-be-scanned S when the first cylindrical lens 13 is positioned so that the laser beam L is focused on the polygonal mirror 15 in an line image irrespective of the beam divergence angle of the laser beam L as emitted from the semiconductor laser 11. FIG. 3A shows the optical path of the laser beam Lmin emitted from a semiconductor laser 11 whose beam divergence angle θmin is minimum when the first cylindrical lens 13 is in a standard position where the laser beam L is focused on the polygonal mirror 15 in an line image and FIG. 3C shows the optical path of the laser beam L emitted from a semiconductor laser 11 whose beam divergence angle θ is larger than the minimum beam divergence angle θmin when the first cylindrical lens 13 is in the standard position. FIG. 3B is an enlarged view of the part surrounded by circle A in FIG. 3A and FIG. 3D is an enlarged view of the part surrounded by circle A in FIG. 3C.

As shown in FIGS. 3A and 3C, the laser beam (L, Lmin) emitted from the laser 11 with a beam divergence angle (θ, θmin) is collimated by the collimator optical system 12 and focused on a deflecting surface of the polygonal mirror 15 in a line image by the first cylindrical lens 13. The laser beam reflected by the deflecting surface once diverges and enters the second cylindrical lens 14. The laser beam is then collimated by the second cylindrical lens 14 and is condensed by the fθ lens 16. As can be seen from FIGS. 3A and 3C, the beam waist BW of the laser beam condensed by the fθ lens 16 is on the surface-to-be-scanned S irrespective of the beam divergence angle when the first cylindrical lens 13 is in the standard position. Assuming that the beam diameter of the laser beam Lmin on the surface-to-be-scanned S (at its beam waist BW) is 2ro as shown in FIG. 3B and that of the laser beam L is 2r as shown in FIG. 3C, 2ro is larger than 2r from the aforesaid formula (1) since the beam divergence angle θ of the laser beam L is larger than that θmin of the laser beam Lmin.

In the case of a semiconductor laser 11 whose beam divergence angle is θmin, the first cylindrical lens 13 is fixed in the standard position shown by the dashed line in FIG. 1A which is at a distance ko from the polygonal mirror 15. In the case of a semiconductor laser 11 whose beam divergence angle θ is larger than θmin, the first cylindrical lens 13 is fixed in a position at a distance k from the polygonal mirror 15 as shown by the solid line in FIG. 1A shifted from the standard position in the direction of the optical axis. In this particular embodiment, ko>k, that is, the first cylindrical lens 13 is shifted toward the polygonal mirror 15.

When the first cylindrical lens 13 is shifted toward the polygonal mirror 15, the beam waist BW of the laser beam L is shifted forward away from the surface-to-be-scanned S as clearly shown in FIG. 1A. Assuming that the beam diameter of the laser beam L in this state is 2r', 2r' is larger than 2r. Accordingly when the distance k of the first cylindrical lens 13 from the polygonal mirror 15 is selected so that 2r' is equal to 2ro, the beam diameter of the laser beam on the surface-to-be-scanned S or the spot size can be constant irrespective of the beam divergence angle of the semiconductor laser 11 used.

Since the intensity of the scanning laser beam substantially exhibits Gaussian distribution, the intensity distribution at a portion slightly distant from the beam waist BW may be considered to be similar to that at the beam waist BW.

For example, when light scanning systems are to be assembled using semiconductor lasers whose beam divergence angles vary within the range of 10±1°, the standard position of the first cylindrical lens 13 (or the distance ko of the first cylindrical lens 13 from the polygonal mirror 15) is set so that the beam waist BW of the laser beam L is positioned on the surface-to-be-scanned S. Then when a semiconductor laser which is to be incorporated in a light scanning system is one whose beam divergence angle is 9°, the first cylindrical lens 13 is fixed in the standard position. Assuming that the beam diameter at the beam waist BW of the laser beam emitted from the semiconductor laser whose beam divergence angle is 9° is 100 μm, when a semiconductor laser which is to be incorporated in a light scanning system is one whose beam divergence angle is larger than 9°, the first cylindrical lens 13 should be fixed in a position where the beam waist BW of the laser beam is positioned away from the surface-to-be-scanned S and the beam diameter of the laser beam on the surface-to-be-scanned S becomes 100 μm.

For example, assuming that the beam diameter at the beam waist BW of a semiconductor laser whose beam divergence angle is 11° is 2r (μm), the beam diameter 2r' (μm) in a cross-section shifted from the beam waist BW by a distance Δz (mm) in the direction of the optical axis can be calculated according to the following formula (2).

$$2r'=2r\{1+(\lambda \Delta z/\Pi r^2)^2\}^{1/2} \quad (2)$$

Accordingly by calculating the value of Δz which gives the beam diameter 2r' on the surface-to-be-scanned B of 100 μm and fixing the first cylindrical lens 13 in a position spaced from the polygonal mirror 15 by a distance k corresponding to the value of Δz, the beam diameter on the surface-to-be-scanned S can be made 100 μm. In the case of the semiconductor laser whose beam divergence angle is 11°, the relation between the value of the Δz and the beam diameter 2r' on the surface-to-be-scanned B is as shown in the following table.

| Δz | 0 | 1 | 2 | 3 | 4 | 5 | 6 |
| --- | --- | --- | --- | --- | --- | --- | --- |
| 2r' | 80.0 | 80.6 | 82.5 | 85.5 | 89.6 | 94.5 | 100.2 |

As can be seen from the table, the beam diameter on the surface-to-be-scanned S can be made substantially 100 μm by fixing the first cylindrical lens 13 in a position where the beam waist BW of the laser beam is spaced from the surface-to-be-scanned S by 6 mm.

FIG. 2 shows a light source unit in which the semiconductor laser 11, the collimator optical system 12 and the first cylindrical lens 13 are mounted on a base 20. The base 20 is mounted in a fixed position relative to the polygonal mirror 15. The first cylindrical lens 13 may be mounted on the base 20 to be movable relative to the base 20 and accordingly to the polygonal mirror 15 and may be fixed in a position selected according to the beam divergence angle of the semiconductor laser 11 in the manner described above. The first cylindrical lens 13 may be fixed to the base 20 by any suitable means such as screwing, bonding or the like.

Otherwise since the distance between the base 20 and the polygonal mirror 15 is fixed, the position of the first cylindrical lens 13 relative to the base 20 can be determined according to the beam divergence angle of the semiconductor laser 11. Accordingly, a plurality of subassemblies each of which consists of the base 20, the collimator optical system 12 and the first cylindrical lens 13 and in which the first cylindrical lenses 13 are fixed in different positions relative to the base 20 may be prepared and a semiconductor laser may be mounted on one of the subassemblies in which the first cylindrical lens 13 is in a position suitable for the beam divergence angle of the semiconductor laser.

The light scanning system of the present invention need not be limited to the embodiment described above but may be variously modified.

For example, in the surface tilt compensating optical system, a cylindrical mirror may be employed instead of a cylindrical lens. In this case, the position of the beam waist can be changed by changing the refracting power by rotating the cylindrical mirror.

Further, though, in the embodiment described above, the first cylindrical lens 13 is shifted toward the polygonal mirror 15 from the standard position (k<ko) when the beam divergence angle of the semiconductor laser used is larger than the minimum beam divergence angle θmin so that the beam waist BW is shifted forward of the surface-to-be-scanned S, the first cylindrical lens 13 may be shifted away from the polygonal mirror 15 from the standard position (k>ko) so that the beam waist BW is shifted rearward of the surface-to-be-scanned S.

What is claimed:

1. A light scanning system comprising a semiconductor laser which outputs a laser beam which diverges with a beam divergence angle, a condensing/scanning optical system which condenses the laser beam and causes the laser beam to scan a predetermined surface-to-be-scanned and a surface tilt compensating optical system which compensates for fluctuation in the scanning position of the laser beam due to a surface tilt in the condensing/scanning optical system, wherein the improvement comprises that the distance between the beam waist of the laser beam and the surface-to-be-scanned as measured in the direction of the optical axis of the condensing/scanning optical system is set larger as the beam divergence angle of the laser beam as emitted from the semiconductor laser increases so that the beam diameter of the laser beam on the surface-to-be-scanned is constant irrespective of the beam divergence angle of the laser beam as emitted from the semiconductor laser.

2. A light scanning system having the improvement as defined in claim 1 comprising a semiconductor laser which emits a laser beam with a beam divergence angle, a collimator optical system which collimates the laser beam into substantially parallel rays, a first cylindrical lens, a rotary polygonal mirror which is rotated at a high speed to deflect the laser beam to scan a surface-to-be-scanned, a second cylindrical lens and an fθ lens which focuses the substantially parallel laser beam which are arranged in this order from the side remote from the surface-to-be-scanned, wherein the distance between the beam waist of the laser beam and the surface-to-be-scanned is changed by changing the distance between the polygonal mirror and the first cylindrical lens.

3. A light scanning system comprising a semiconductor laser which outputs a laser beam which diverges with a beam divergence angle and a condensing/scanning optical system which condenses the laser beam and causes the laser beam to scan a predetermined surface-to-be-scanned, wherein the improvement comprises that the distance between the beam waist of the laser beam and the surface-to-be-scanned as measured in the direction of the optical axis of the condensing/scanning optical system is set according to the beam divergence angle of the laser beam as emitted from the semiconductor laser so that the beam diameter of the laser beam on the surface-to-be-scanned is constant irrespective of the beam divergence angle of the laser beam.

* * * * *